US010015816B2

(12) United States Patent
Fujishiro et al.

(10) Patent No.: US 10,015,816 B2
(45) Date of Patent: Jul. 3, 2018

(54) NETWORK APPARATUS AND USER TERMINAL

(71) Applicant: KYOCERA CORPORATION, Kyoto (JP)

(72) Inventors: Masato Fujishiro, Yokohama (JP); Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 134 days.

(21) Appl. No.: 15/024,959

(22) PCT Filed: Sep. 24, 2014

(86) PCT No.: PCT/JP2014/075317
§ 371 (c)(1),
(2) Date: Mar. 25, 2016

(87) PCT Pub. No.: WO2015/046266
PCT Pub. Date: Apr. 2, 2015

(65) Prior Publication Data
US 2016/0262174 A1 Sep. 8, 2016

(30) Foreign Application Priority Data

Sep. 26, 2013 (JP) .................................. 2013-199884

(51) Int. Cl.
H04W 72/12 (2009.01)
H04B 7/04 (2017.01)
(Continued)

(52) U.S. Cl.
CPC ........ H04W 72/1289 (2013.01); H04B 7/024 (2013.01); H04B 7/0456 (2013.01);
(Continued)

(58) Field of Classification Search
None
See application file for complete search history.

(56) References Cited

U.S. PATENT DOCUMENTS 9,282,494 B2 * 3/2016 Folke .................... H04W 36/08
9,674,813 B2 * 6/2017 Jeong .................. H04W 64/006
(Continued)

FOREIGN PATENT DOCUMENTS

JP 2005-094157 A 4/2005
JP 2006-060814 A 3/2006
(Continued)

OTHER PUBLICATIONS

International Search Report issued in PCT/JP2014/075317; dated Dec. 16, 2014.
(Continued)

Primary Examiner — Candal Elpenord
(74) Attorney, Agent, or Firm — Studebaker & Brackett PC

(57) ABSTRACT

A network apparatus according to the present invention comprises: a receiver configured to receive, from a user terminal, channel state information corresponding to a channel state of a downlink signal from a cell to which the user terminal is connected, to the user terminal; a controller configured to determine transmission frequency of the channel state information; and a transmitter configured to transmit, to the user terminal, frequency information indicating the transmission frequency determined by the controller. The controller determines the transmission frequency of the user terminal on the basis of fixation information indicating that the user terminal is a fixed user terminal whose movement is restricted.

15 Claims, 10 Drawing Sheets

(51) Int. Cl.
*H04J 11/00* (2006.01)
*H04W 4/02* (2018.01)
*H04L 5/06* (2006.01)
*H04L 12/26* (2006.01)
*H04L 27/34* (2006.01)
*H04W 72/04* (2009.01)
*H04B 7/024* (2017.01)
*H04B 7/06* (2006.01)
*H04B 7/0456* (2017.01)
*H04L 5/00* (2006.01)

(52) U.S. Cl.
CPC ........... *H04B 7/065* (2013.01); *H04B 7/0639* (2013.01); *H04J 11/00* (2013.01); *H04J 11/0053* (2013.01); *H04L 5/06* (2013.01); *H04L 27/3494* (2013.01); *H04W 4/027* (2013.01); *H04L 5/0035* (2013.01); *H04L 43/0811* (2013.01)

(56) References Cited

U.S. PATENT DOCUMENTS

| | | |
|---|---|---|
| 2006/0039318 A1 | 2/2006 | Oh et al. |
| 2007/0109981 A1 | 5/2007 | Hirano et al. |
| 2008/0049813 A1 | 2/2008 | Kurose et al. |
| 2008/0285477 A1* | 11/2008 | Kuroda ................ H04L 1/0026 370/252 |
| 2011/0085448 A1* | 4/2011 | Kuwahara ............ H04W 16/10 370/242 |
| 2013/0188503 A1 | 7/2013 | Anepu et al. |
| 2013/0223409 A1* | 8/2013 | Jung ................ H04W 36/0072 370/331 |

FOREIGN PATENT DOCUMENTS

| | | |
|---|---|---|
| JP | 2008-054125 A | 3/2008 |
| JP | 2009-284252 A | 12/2009 |
| JP | 2013-524645 A | 6/2013 |

OTHER PUBLICATIONS

Written Opinion issued in PCT/JP2014/075317; dated Dec. 16, 2014.

3rd Generation Partnership Project; Technical Specification Group Radio Access Network; Evolved Universal Terrestrial Radio Access (E-UTRA); Physical layer procedures; 3GPP TS 36.213; V11.3.0; Jun. 2013; pp. 1-176; Release 11; 3GPP Organizational Partners.

* cited by examiner

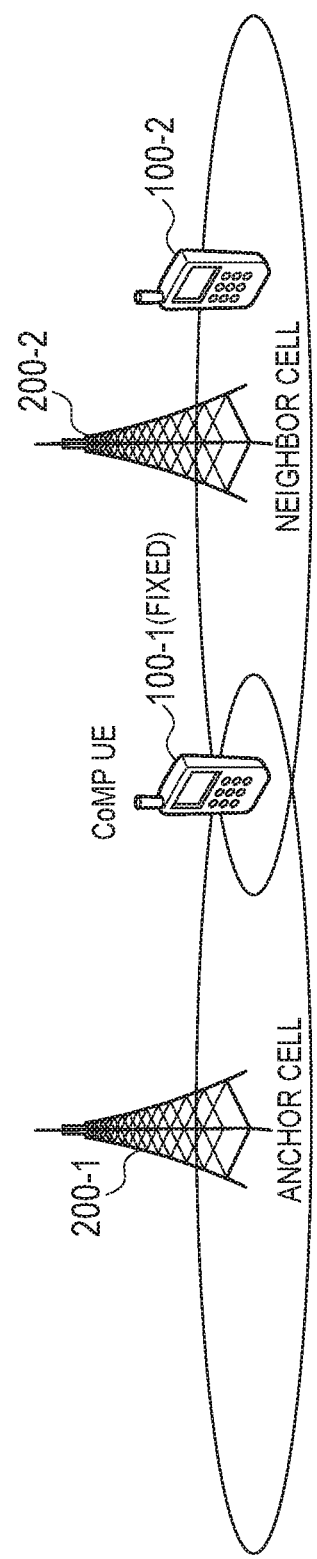

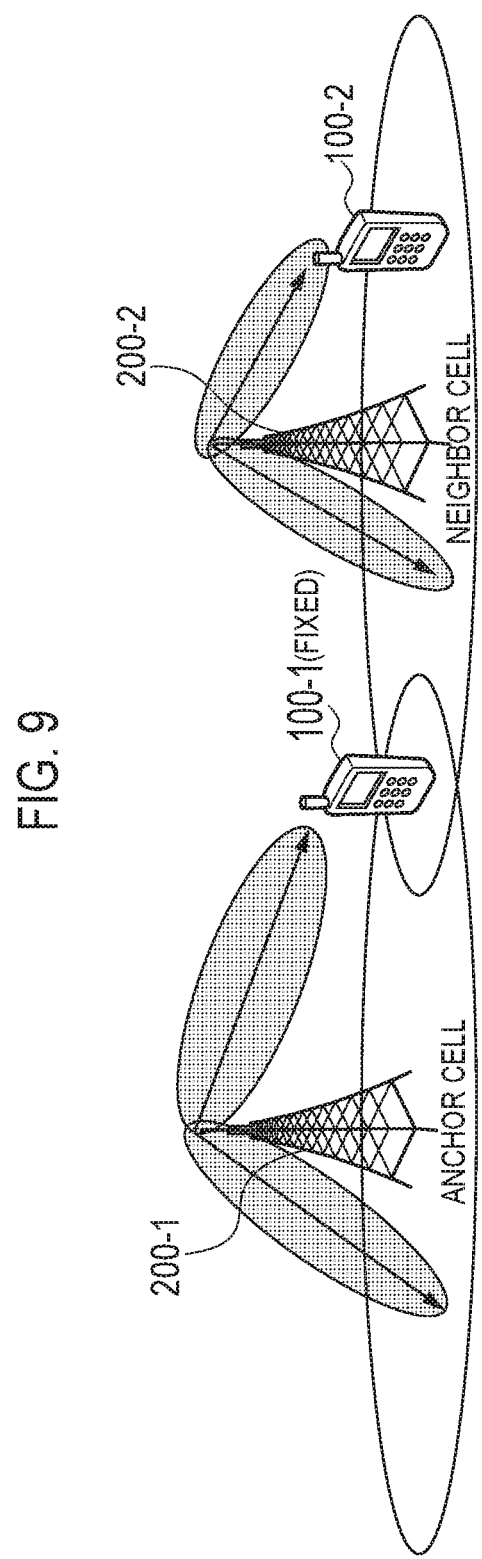

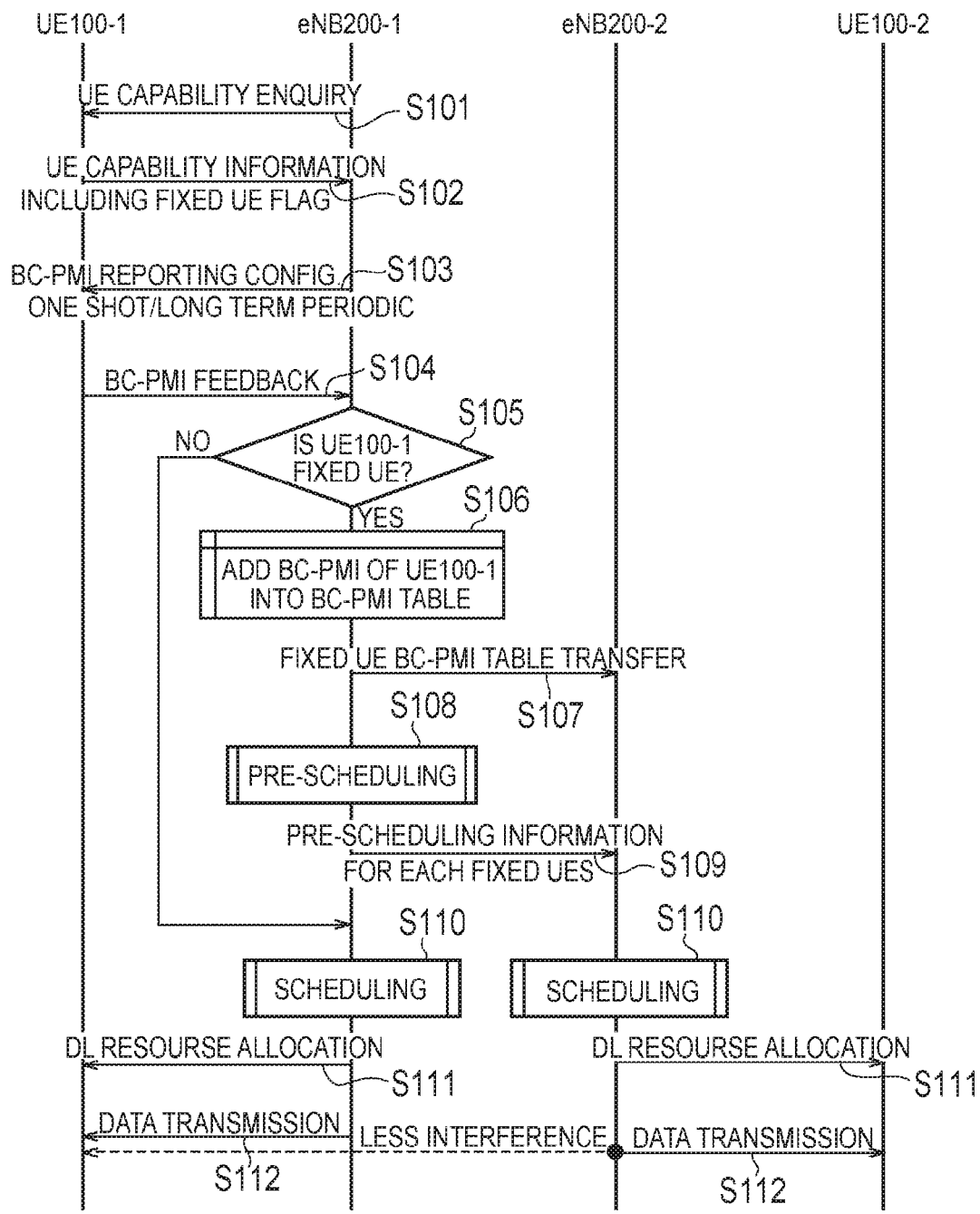

NETWORK APPARATUS AND USER TERMINAL

TECHNICAL FIELD

The present invention relates to a network apparatus and a user terminal in a mobile communication system.

BACKGROUND ART

In a LTE system of which the specification is designed in 3GPP (3rd Generation Partnership Project) which is a project aiming to standardize a mobile communication system, a user terminal reports channel state information (CSI) corresponding to a channel state of a downlink signal from a base station (for example, see Non Patent Document 1).

The channel state information is configured of channel quality information (CQI) indicating reception quality of a channel state of a downlink signal, information indicating precoder matrix information (PMI) indicating a precoder matrix which determines transmission directionality, and rank information (RI) indicating a rank which determines the number of signal sequences (the number of layers), for example.

Performing scheduling by using channel state information transmitted from each user terminal enables a base station to perform good communication with a user terminal.

PRIOR ART DOCUMENT

Non-Patent Document

Non Patent Document 1: 3GPP technical specification "TS 36.213 V11. 3. 0" (June 2013)

SUMMARY OF THE INVENTION

However, a base station periodically receives channel state information from each user terminal. Therefore, there is a problem that overhead increases in accordance with an increase in the number of user terminals.

Thus, the present invention provides a network apparatus with which it is possible to reduce overhead due to transmission of channel state information from a user terminal, and a user terminal therefor.

According to an embodiment, a network apparatus in a mobile communication system, comprises: a receiver configured to receive, from a user terminal, channel state information corresponding to a channel state of a downlink signal from a cell to which the user terminal is connected, to the user terminal; a controller configured to determine transmission frequency of the channel state information; and a transmitter configured to transmit, to the user terminal, frequency information indicating the transmission frequency determined by the controller, wherein the controller determines the transmission frequency of the user terminal on the basis of fixation information indicating that the user terminal is a fixed user terminal whose movement is restricted.

BRIEF DESCRIPTION OF THE DRAWINGS

FIG. 8 is an explanatory diagram for describing an operation overview of CoMP according to the first embodiment.
FIG. 9 is an explanatory diagram for describing an operation overview of the CoMP according to the first embodiment.
FIG. 10 is an operation sequence chart according to the first embodiment.

DESCRIPTION OF THE EMBODIMENT

Overview of Embodiments

Figure 1:
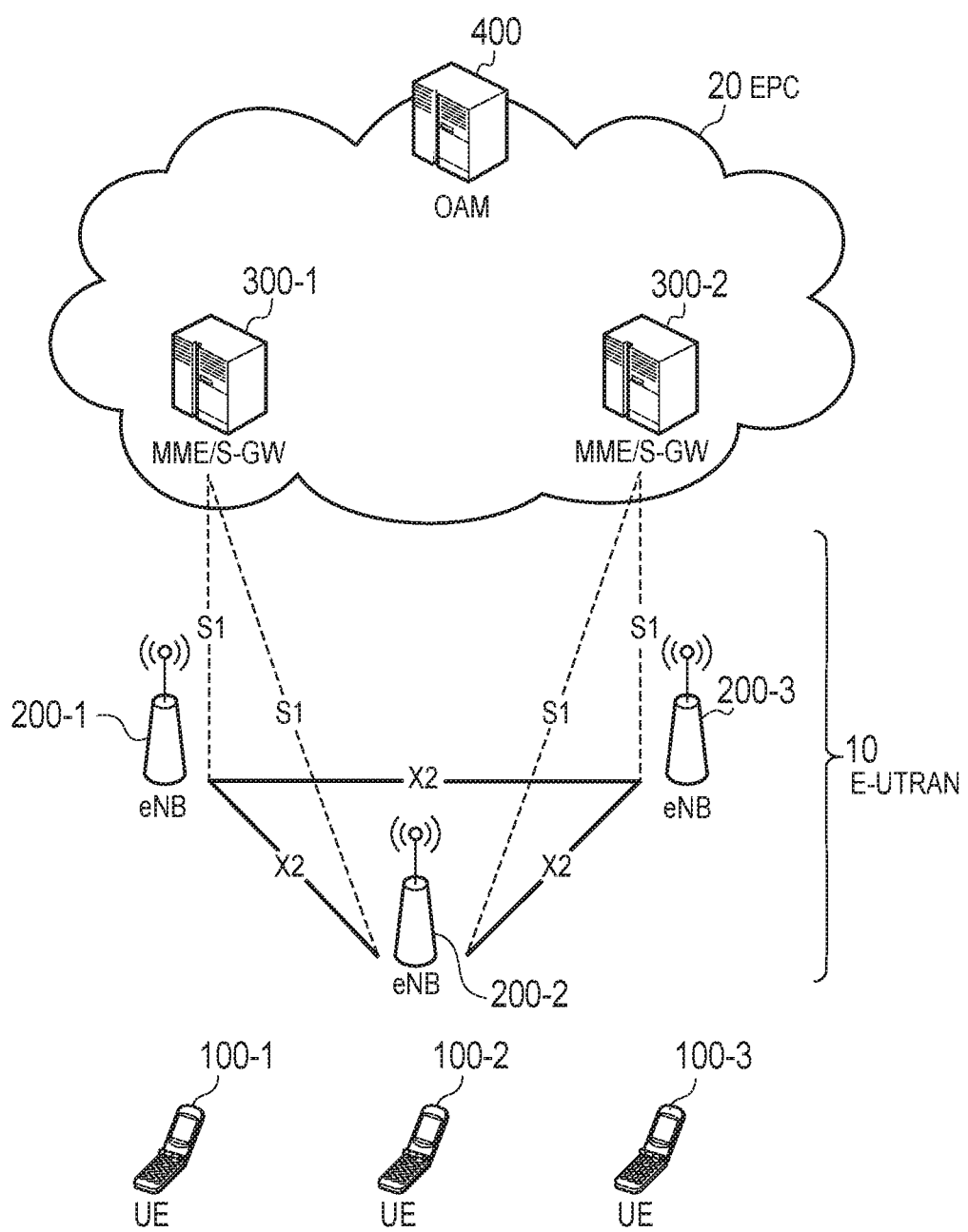
FIG. 1 is a configuration diagram of an LTE system.

A network apparatus according to a first embodiment is a network apparatus in a mobile communication system. The network apparatus comprises: a receiver configured to receive, from a user terminal, channel state information corresponding to a channel state of a downlink signal from a cell to which the user terminal is connected, to the user terminal; a controller configured to determine transmission frequency of the channel state information; and a transmitter configured to transmit, to the user terminal, frequency information indicating the transmission frequency determined by the controller, wherein the controller determines the transmission frequency of the user terminal on the basis of fixation information indicating that the user terminal is a fixed user terminal whose movement is restricted.

In the network apparatus according to the first embodiment, the transmitter transmits, to the user terminal, an inquiry of capability information indicating capability of the user terminal before the controller determines the transmission frequency, and the receiver receives, from the user terminal, the capability information that includes the fixation information and is transmitted in response to the inquiry.

In the network apparatus according to another embodiment, the receiver receives the fixation information together with the channel state information.

In the network apparatus according to the first embodiment, the controller determines, on the basis of the fixation information, as the transmission frequency of the user terminal, lower transmission frequency than normal transmission frequency of the channel state information when the user terminal is not the fixed user terminal.

In the network apparatus according to the first embodiment, the controller determines lower transmission frequency than the normal transmission frequency as the transmission frequency of the user terminal when a ratio of the number of the fixed user terminals within the cell to the number of user terminals other than the fixed user terminals within the cell exceeds a threshold value.

In the network apparatus according to the first embodiment, the controller determines lower transmission frequency than the normal transmission frequency as the transmission frequency of the user terminal when the number of handovers in the cell is equal to or less than a threshold value.

In the network apparatus according to the embodiment, the channel state information includes information indicating at least any of channel quality information indicating reception quality of a channel state of a downlink signal, precoder matrix information indicating a precoder matrix which determines transmission directionality, rank information indicating a rank which determines the number of signal sequences, and a special precoder matrix that is used to determine a precoder matrix applicable to downlink multi-antenna transmission to another user terminal different from the user terminal as well as that is a precoder matrix in which a null or a beam is directed toward the user terminal.

In the network apparatus according to the first embodiment, a storage is further comprised, the storage configured to store a table in which an identifier indicating a user terminal that is the fixed user terminal and the channel state information from the fixed user terminal are associated, wherein the storage updates the table on the basis of the received channel state information.

In the network apparatus according to the first embodiment, the network apparatus is a base station configured to manage the cell, and the controller performs scheduling for CoMP communication on the basis of the table when the CoMP communication in which the base station and a neighboring base station adjacent to the base station perform, in cooperation with each other, communication with the user terminal is performed.

In the network apparatus according to the first embodiment, the controller performs control to transfer the table to the neighboring base station before performing the scheduling.

In the network apparatus according to another embodiment, the network apparatus is a base station configured to manage the cell and have a plurality of antenna elements, the controller selects the user terminal that is the fixed user terminal as a partner for calibration for correcting a variation in amplitude and phase shift among the plurality of antennas, the receiver receives, as the channel state information, a measurement report used for the calibration from the user terminal which is the partner, and the controller performs the calibration on the basis of the measurement report.

A user terminal according to a second embodiment is a user terminal in a mobile communication system and comprises: a transmitter configured to transmit, to a cell to which the user terminal is connected, channel state information corresponding to a channel state of a downlink signal from the cell to the user terminal; a receiver configured to receive frequency information indicating transmission frequency of the channel state information; and a controller configured to set the transmission frequency on the basis of the frequency information, wherein the controller sets, in accordance with a movement state of the user terminal, different transmission frequency against the transmission frequency indicated by the frequency information.

In the user terminal according to the second embodiment, the controller sets lower transmission frequency than the transmission frequency indicated by the frequency information as the different transmission frequency when deciding that the user terminal is stationary.

In the user terminal according to the second embodiment, the controller performs control to periodically or unperiodically measure channel quality of a downlink, and the controller decides that the user terminal is stationary when a difference between first channel quality that is newly measured and second channel quality that is measured prior to the first channel quality is equal to or less than a threshold value.

In the user terminal according to the second embodiment, the transmitter transmits, to the cell, together with the channel state information, fixation information indicating that the user terminal is a fixed user terminal whose movement is restricted, as a reason for setting the different transmission frequency when it is decided that the user terminal is stationary.

In the user terminal according to the second embodiment, the controller sets higher transmission frequency than the transmission frequency indicated by the frequency information, as the different transmission frequency when deciding that the user terminal is moving at a speed in a predetermined range.

In the user terminal according to the second embodiment, the controller sets lower transmission frequency than the transmission frequency indicated by the frequency information, as the different transmission frequency when deciding that the user terminal is moving at a speed faster than the speed in the predetermined range.

In the user terminal according to the second embodiment, the transmitter transmits information indicating that the user terminal is moving at the speed in the predetermined range or at the speed faster than the speed in the predetermined range, as a reason for setting the different transmission frequency, together with at least any of capability information indicating capability of the user terminal, the channel state information, and a response to setting information including the frequency information when it is decided that the user terminal is moving at the speed in the predetermined range or at the speed faster than the speed in the predetermined range.

It is noted that the network apparatus in CLAIMS may be an apparatus forming a core network or may be a base station.

First Embodiment

Hereinafter, with reference to the accompanying drawings, the following description will be provided for an embodiment when the present invention is applied to a mobile communication system (hereinafter, an LTE system) configured according to 3GPP standards.

(LTE System)

FIG. 1 is a configuration diagram of the LTE system according to the first present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication apparatus and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 comprises a cell and performs radio communication with the UE 100 which establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a MME (Mobility Management Entity)/S-GW (Serving-Gateway) 300 and an OAM 400 (Operation and Maintenance).

The MME is a network node for performing various mobility controls for the UE 100, for example, and corresponds to a control station. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server apparatus managed by an operator and performs maintenance and monitoring of the E-UTRAN 10.

Next, the configurations of the UE 100 and the eNB 200 will be described.

Figure 2:
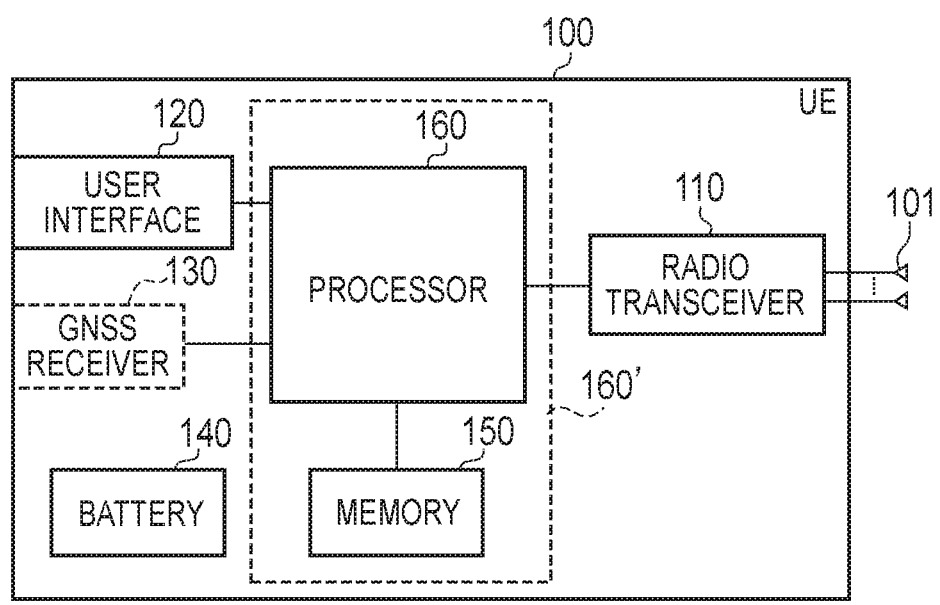
FIG. 2 is a block diagram of a UE.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 constitutes a storage and the processor 160 constitutes a controller.

The UE 100 may not have the GNSS receiver 130. Furthermore, the memory 150 may be integrally formed with the processor 160, and this set (that is, a chipset) may be called a processor 160'.

The antennas 101 and the radio transceiver 110 are used to transmit and receive a radio signal. The radio transceiver 110 converts a baseband signal output from the processor 160 into the radio signal, and transmits the radio signal from the antennas 101. Furthermore, the radio transceiver 110 converts the radio signal received by the antennas 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

The processor 160 generates channel state information (CSI) on the basis of a signal received by the radio transceiver 110 (particularly, a reference signal), and then feeds back the channel state information to the serving cell. The channel state information includes PMI (Precoding Matrix Indicator), RI (Rank Indicator), and CQI (Channel Quality Indicator), for example.

An "entire downlink band" or a "subband" is stipulated as the frequency unit (the target frequency band) that is to be fed back, and which one of these to use is determined in accordance with the instruction from the eNB 200. A subband is a frequency unit obtained by dividing the entire downlink band, and has the bandwidth of a plurality of resource blocks. The details of the information that is fed back (such as the PMI, the RI, and the CQI) are described later.

Figure 3:
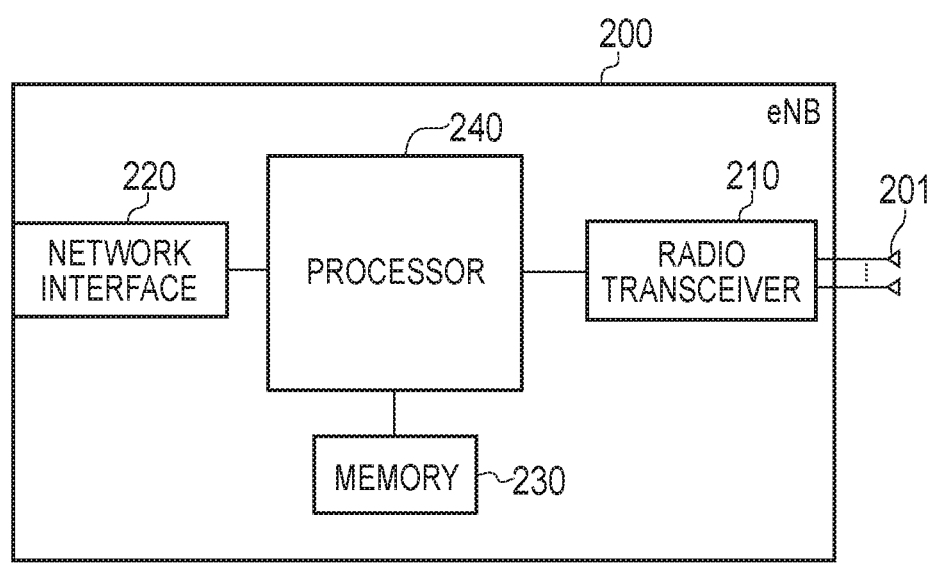
FIG. 3 is a block diagram of an eNB.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 constitutes a storage and the processor 240 constitutes a controller. The memory 230 may be integrally formed with the processor 240, and this set (that is, a chipset) may be called a processor 240'.

The antennas 201 and the radio transceiver 210 are used to transmit and receive a radio signal. The radio transceiver 210 converts the baseband signal output from the processor 240 into the radio signal, and transmits the radio signal from the antennas 201. Furthermore, the radio transceiver 210 converts the radio signal received by the antennas 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, encoding and decoding and the like of the baseband signal and a CPU that performs various processes by executing the program stored in the memory 230. The processor 240 implements various processes and various communication protocols described later.

Figure 4:
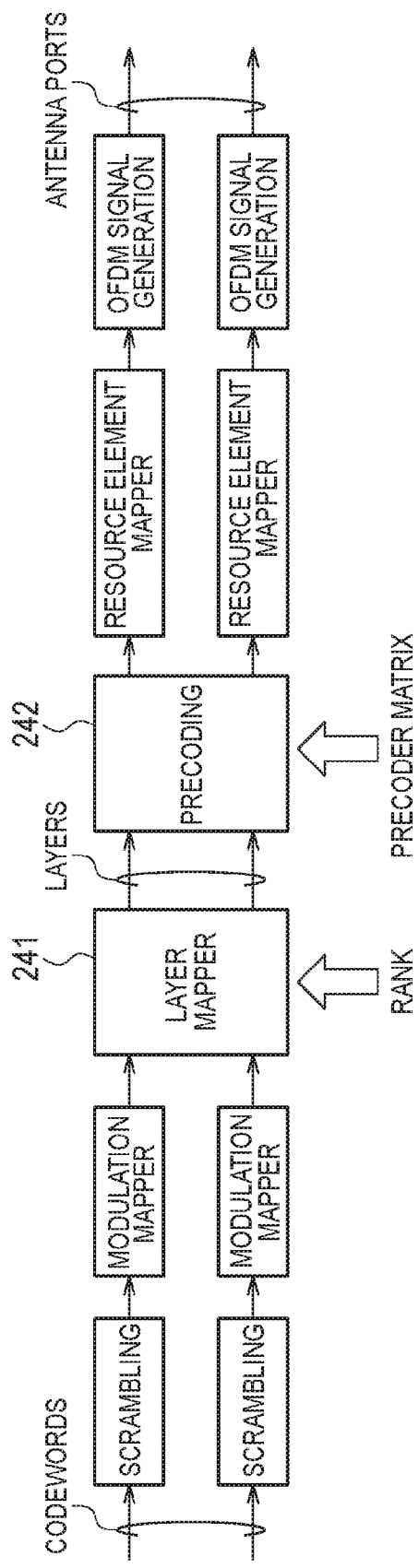
FIG. 4 is a block diagram related to downlink multi-antenna transmission.

The processor 240 performs downlink multi-antenna transmission by applying the precoder matrix and the rank. FIG. 4 is a block diagram of the processor 240 related to the downlink multi-antenna transmission. The details of each block are described in 3GPP TS 36.211, for example. However, an overview of each block will be described herein.

As illustrated in FIG. 4, one or two codewords to be transmitted on a physical channel are scrambled, are modulated into a modulation symbol, and then are mapped to a plurality of layers by a layer mapper 241. The codeword is an error correction data unit. The rank (number of layers) is determined on the basis of the RI that is fed back.

A precoder 242 precodes a modulation symbol of each layer by using the precoder matrix. The precoder matrix is determined on the basis of the PMI that is fed back. The precoded modulation symbol is mapped to a resource element, is converted into an OFDM signal of a temporal domain, and is output to each antenna port.

Figure 5:
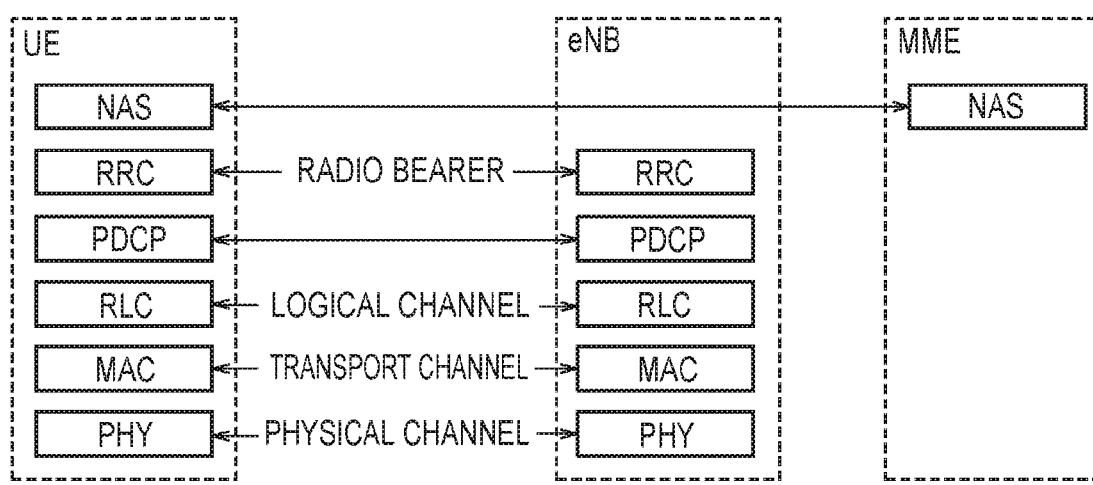
FIG. 5 is a protocol stack diagram of a radio interface in the LTE system.

FIG. 5 is a protocol stack diagram of a radio interface in the LTE system.

As illustrated in FIG. 5, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process by hybrid ARQ (an HARQ) and the like. Between the MAC layer of the UE 100 and the MAC layer of the eNB 200, data is transmitted via a transport channel. The MAC layer of the eNB 200 includes a MAC scheduler that determines an uplink and downlink transport format (a transport block size, a modulation and coding scheme and the like) and an allocation resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state (a RRC Connected state), and when the RRC connection is not established, the UE 100 is in an idle state (a RRC Idle state).

A NAS (Non-Access Stratum) layer positioned above the RRC layer performs session management or mobility management, for example.

Figure 6:
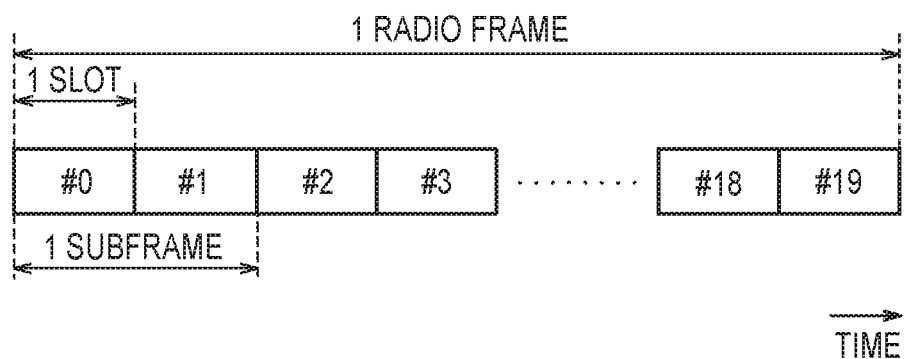
FIG. 6 is a configuration diagram of a radio frame used in the LTE system.

FIG. 6 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink.

As a duplex scheme, either an FDD (Frequency Division Duplex) scheme or a TDD (Time Division Duplex) scheme is used. However, in the first embodiment, the FDD scheme is mainly assumed.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources allocated to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH). Furthermore, a reference signal such as a cell-specific reference signal (CRS) is distributed and arranged in each subframe.

The PDCCH carries control information. The control information, for example, includes the uplink SI (Scheduling Information), the downlink SI, and a TPC bit. The uplink SI is information indicating the allocation of uplink radio resources, and the downlink SI is information indicating the allocation of downlink radio resources. The TPC bit is information for instructing an increase or decrease in the uplink transmission power.

The PDSCH carries the control information and/or user data. For example, a downlink data region may be allocated only to the user data, or may be allocated such that the user data and the control information are multiplexed.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH).

The PUCCH carries control information. The control information includes, for example, the CQI, the PMI, the RI, SR (Scheduling Request), and ACK/NACK.

The CQI indicates a modulation and coding scheme (that is, a recommended MCS) that is preferably used in the downlink, on the basis of the reception status of the downlink.

The PMI is information indicating a precoder matrix that is preferably used in the downlink. In other words, the PMI is information indicating a precoder matrix in which a beam is directed toward the UE serving as a transmission source of the PMI. For example, in order for the reception status of the UE 100 to be improved, the UE 100 selects the PMI to be fed back to the eNB 200.

The RI indicates a rank that is preferably used in the downlink. For example, in order for the rank corresponding to the reception status of the UE 100 to be applied, the UE 100 selects the PMI to be fed back to the eNB 200.

The SR is information for requesting the allocation of uplink radio resources.

The ACK/NACK is information indicating whether or not the decoding of a signal transmitted via a downlink physical channel (for example, PDSCH) is successful.

The PUSCH is a physical channel that carries the control information and/or user data. For example, an uplink data region may be allocated only to the user data, or may be allocated such that the user data and the control information are multiplexed.

Operation Overview According to First Embodiment

By using FIG. 7 to FIG. 9, an operation overview according to the first embodiment will be described, below.

First, by using FIG. 7, an operation related to a report of channel state information according to the present embodiment will be described. FIG. 7 is a diagram for describing the operation overview of reporting the channel state information according to the present embodiment.

Figure 7:
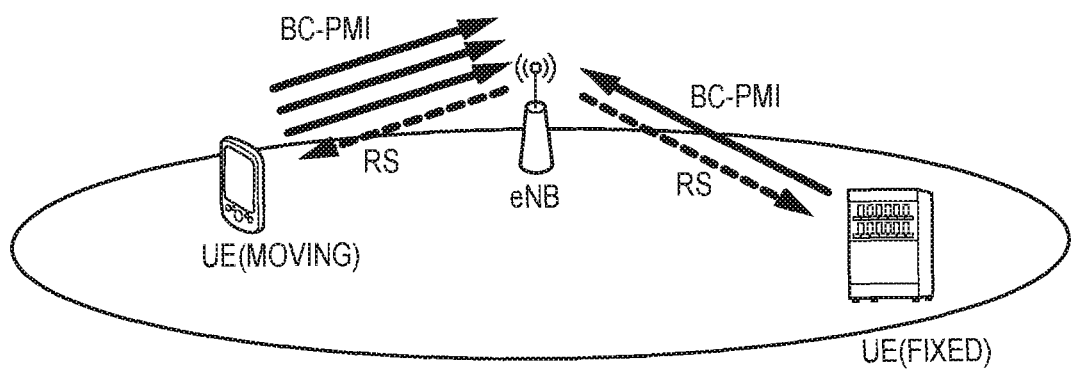
FIG. 7 is a diagram for describing an operation overview of reporting channel state information according to a first embodiment.

As illustrated in FIG. 7, the mobile communication system according to the present embodiment has a fixed UE 100, a moving UE 100, and the eNB 200.

The fixed UE 100 is a UE 100 whose movement is restricted. As an example, the fixed UE 100 is a UE 100 whose location is fixed. Alternatively, the fixed UE 100 is a UE 100 which has an MTC function. On the other hand, the moving UE 100 is a normal UE 100 whose movement is not restricted. The fixed UE 100 and the moving UE 100 establish a connection with a cell managed by the eNB 200.

The fixed UE 100 and the moving UE 100 report, on the basis of a reference signal (RS) from the cell, channel state information corresponding to a channel state of the reference signal.

In the present embodiment, the eNB 200 determines transmission frequency (feedback frequency) of the channel state information (for example, BC-PMI which will be described later). The eNB 200 determines the transmission frequency of the channel state information of the UE 100, on the basis of fixation information indicating that the UE 100 is the fixed UE 100. The eNB 200 transmits, to the UE 100, frequency information indicating the determined transmission frequency. For example, the eNB 200 determines, on the basis of the fixation information, lower transmission frequency than normal transmission frequency in the moving UE 100 as the transmission frequency of the channel state information from the fixed UE 100. It is noted that the transmission frequency indicates the number of transmissions (for example, once) or transmission cycle.

Further, in the present embodiment, the eNB 200 stores a fixed UE table in which an identifier indicating the UE 100 that is the fixed UE 100 and the channel state information from the UE 100 are associated. The eNB 200 updates the fixed UE table on the basis of channel state information (BC-PMI) received from the fixed UE 100. The channel state information recorded in the fixed UE table may be the BC-PMI, for example, or other information (such as, the CQI, the PMI, and the RI) may be recorded.

Next, by using FIG. 8 and FIG. 9, an operation overview of CoMP communication according to the present embodiment will be described. FIG. 8 and FIG. 9 are explanatory diagrams for describing the operation overview of CoMP according to the present embodiment.

In FIG. 8 and FIG. 9, an eNB 200-1 and an eNB 200-2 configure cells that are adjacent to each other.

As illustrated in FIG. 8, a UE 100-1 establishes a connection with the cell of the eNB 200-1. That is, the UE 100-1 uses, as the serving cell, the cell of the eNB 200-1 to perform communication.

In the present embodiment, the UE 100-1 is a fixed UE 100. Further, the UE 100-1 is located at a boundary area of the respective cells of the eNB 200-1 and the eNB 200-2. In such a case, normally, the UE 100-1 receives the influence of the interference from the cell of the eNB 200-2.

On the other hand, a UE 100-2 establishes a connection with the cell of the eNB 200-2. That is, the UE 100-2 uses, as the serving cell, the cell of the eNB 200-2 to perform communication. It is noted that in FIG. 8, only one UE 100-2 is illustrated; however, a plurality of UEs 100-2 may establish a connection with the cell of the eNB 200-2.

In the present embodiment, in order to improve throughput of the UE 100-1 that is located at the cell end of the eNB 200-1, the eNB 200-1 and the eNB 200-2 perform CB-CoMP. In the CB-CoMP, the serving cell of the UE 100-1 is called an "anchor cell."

Further, in the CB-CoMP, the eNB 200-2, which acts as the main interference source, adjusts the transmission directionality so as to reduce the influence of the interference exerted on the UE 100-1. Specifically, the eNB 200-2 performs transmission to the UE 100-2 by directing a beam toward the UE 100-2 while directing a null toward the UE 100-1.

The UE 100-1 that is the target of the CB-CoMP performs a special feedback to the eNB 200-2 in addition to the normal feedback (the PMI, the RI, and the CQI) to the eNB 200-1. In the first embodiment, the UE 100-1 feeds back the special PMI to the eNB 200-2. It is noted that the UE 100-1 may feed back the special RI.

The normal PMI is the information that is used to determine the precoder matrix applicable in the downlink multi-antenna transmission to the UE 100-1, as well as is the information indicating the precoder matrix (the precoder matrix in which a beam is directed toward the UE 100-1) preferable for the UE 100-1. The UE 100-1 performs the feedback of the normal PMI on the basis of, for example, the reference signal received from the eNB 200-1.

In contrast, the special PMI is the information that is used to determine the precoder matrix applicable in the downlink multi-antenna transmission to the UE 100 other than the UE 100-1 (for example, the UE 100-2), as well as is the information indicating the precoder matrix (the precoder matrix in which a null is directed toward the UE 100-1) preferable for the UE 100-1. Such PMI is called BC (Best Companion)-PMI. The UE 100-1 performs the feedback of the BC-PMI on the basis of, for example, the reference signal received from the eNB 200-2.

For example, the feedback information to the eNB 200-2 includes a plurality of combinations of the BC-PMI and the RI in which the influence of the interference exerted on the UE 100-1 by the eNB 200-2 is small. In the present embodiment, the BC-PMI corresponds to the precoder matrix information, and the RI corresponds to the rank information. In the case of the settings in which the feedback of the BC-PMI and the RI is performed for each subband, the feedback information of one subband includes a plurality of combinations of the BC-PMI and the RI.

For example, the combinations may include n (n≥2) of BC-PMIs starting from the BC-PMI in which the influence of the interference is the smallest, or the combinations may include BC-PMIs in which the influence of the interference is less than a threshold value.

It is noted that the UE 100-1 may feed back the combinations of the BC-PMI and the RI to the eNB 200-2 via the serving cell (the eNB 200-1), or may directly feed back the same to the eNB 200-2.

For example, the eNB 200-2 allocates the same radio resource as that of the UE 100-1 to the UE 100 (the UE 100-2) within the cell of the eNB 200-2 that feeds back the PMI and the RI matching any one of the combinations of the BC-PMI and the RI fed back from the UE 100-1. In this case, the eNB 200-2 is assumed to dynamically or quasi-statically share the scheduling information of the UE 100-1 with the eNB 200-1. Also, the eNB 200-2 performs transmission to the UE 100-2 according to the matching PMI and RI.

As a result, as illustrated in FIG. 9, the eNB 200-2 is capable of performing transmission to the UE 100-2 by directing a beam toward the UE 100-2 while directing a null toward the UE 100-1. Thus, the interference exerted on the UE 100-1 can be suppressed.

It is noted that if the UE 100 within the cell of the eNB 200-2 that feeds back the PMI and the RI matching any one of the combinations of the BC-PMI and the RI fed back from the UE 100-1 does not exist, the eNB 200-2 is believed to perform either of two operations, namely that of not allocating the same radio resource as that of the UE 100-1, or that of allocating a radio resource even when the PMI is not matching.

On the other hand, the eNB 200-1 performs transmission to the UE 100-1 according to the normal PMI and RI that are fed back from the UE 100-1. As a result, the eNB 200-1 is capable of directing a beam toward the UE 100-1.

Operation Sequence According to First Embodiment

Next, an operation sequence according to the first embodiment will be described. FIG. 10 is an operation sequence chart according to the first embodiment.

It is noted that as described above, the UE 100-1 is a fixed UE in the present embodiment.

As illustrated in FIG. 10, in step S101, the eNB 200-1 transmits, to the UE 100-1, UE capability enquiry that is an inquiry of UE capability information. The UE 100-1 receives the UE capability enquiry.

In step S102, the UE 100-1 transmits, to the eNB 200-1, UE capability information in response to the UE capability enquiry. The eNB 200-1 receives the UE capability information.

The UE capability information includes fixation information (Fixed UE Flag) indicating that the UE 100-1 is a fixed UE 100. In the present embodiment, when the fixed UE Flag is on, it indicates that the UE 100-1 is a fixed UE 100. It is noted that the fixation information may be information indicating that the UE 100-1 has the MTC function or information indicating that the UE 100-1 is in a supplying state (DC supplying state or AC supplying state), for example.

The eNB 200-1 decides that the UE 100-1 is a fixed UE 100 on the basis of the UE capability information.

In step S103, the eNB 200-1 transmits, to the UE 100-1, BC-PMI reporting configuration (BC-PMI reporting config.) for configuring a report of the BC-PMI. The UE 100-1 receives the BC-PMI reporting configuration.

The eNB 200-1 determines the transmission frequency of the UE 100-1 on the basis of the fixation information. Specifically, the eNB 200-1 determines lower transmission frequency than the normal transmission frequency of the channel state information when the UE 100-1 is not a fixed UE 100, as the transmission frequency of the UE 100-1. That is, the eNB 200-1 determines the transmission frequency of the channel state information of the UE 100-1 such that only a single transmission is performed or the transmission cycle becomes longer than usual. Then, for the BC-PMI report configuration to the fixed UE 100, the eNB 200-1 transmits, to the UE 100-1, the BC-PMI reporting configuration for transmitting BCPMI only once or the BC-PMI reporting configuration for configuring a longer transmission cycle than the normal transmission cycle to the UE 100-1.

The eNB 200-1 may determine the transmission frequency of the fixed UE 100 on the basis of other information, in addition to the fixation information.

For example, the eNB 200-1 may determine the transmission frequency of the fixed UE 100 on the basis of the ratio of the number of fixed UEs 100 within the cell of the eNB 200-1 to the number of UEs 100 other than the fixed UE 100 (that is, the number of moving UEs 100) within the cell of the eNB 200-1 (the number of fixed UEs 100/the number of moving UEs 100). Specifically, when "the number of fixed UEs 100 ≤the number of non-fixed UEs 100+α (predetermined value)" is satisfied, a shorter transmission cycle is determined as the transmission cycle of the channel state information of the UE 100-1. On the other hand, when "the number of fixed UEs 100 >the number of non-fixed UEs 100+α (predetermined value)" is satisfied, a longer transmission cycle is determined as the transmission cycle of the channel state information of the UE 100-1.

Alternatively, the eNB 200-1 may determine the transmission frequency of the fixed UE 100 on the basis of the number of handovers in the cell of the eNB 200-1. Specifically, when "the number of handovers ≤β (predetermined value)" is satisfied, a longer transmission cycle is determined as the transmission cycle of the channel state information of the UE 100-1. When "the number of handovers >β (predetermined value)" is satisfied, a shorter transmission cycle is determined as the transmission cycle of the channel state information of the UE 100-1. The eNB 200-1 may determine the transmission frequency of the channel state information of the UE 100-1 by appropriately combining these determination methods.

In step S104, the UE 100-1 transmits (feeds back), to the eNB 200-1, BC-PMI (BC-PMI feedback) on the basis of a transmission configuration in accordance with the BC-PMI report configuration. The eNB 200-2 receives the BC-PMI. It is noted that the UE 100-1 may feed back other information (the PMI, the RI, etc.) in addition to the BC-PMI.

In step S105, the eNB 200-1 decides, in response to the reception of the BC-PMI from the UE 100-1, whether or not the UE 100-1 is the fixed UE 100. When the UE 100-1 is the fixed UE 100, the eNB 200-1 executes the process of step S106. On the other hand, when the UE 100-1 is not the fixed UE 100, the eNB 200-1 executes the process of step S110. In the present embodiment, the eNB 200-1 decides that the UE 100-1 is the fixed UE 100 on the basis of the fixation information in step S102, and executes the process of step S106.

In step S106, the eNB 200-1 updates the fixed UE table by adding the BC-PMI received from the UE 100-1 to the fixed UE table.

In step S107, the eNB 200-1 transfers the updated fixed UE table to the eNB 200-2 by using the X2 interface. The eNB 200-2 receives the fixed UE table. As a result, the eNB 200-1 and the eNB 200-2 share the fixed UE table. It is noted that the eNB 200-2 may transmit, to the eNB 200-1, a fixed UE table based on the fixed UE 100 which is a subordinate of the eNB 200-2.

In step S108, the eNB 200-1 performs pre-scheduling on the basis of the fixed UE table. Specifically, the eNB 200-1 performs pre-scheduling for allocating a radio resource to the UE 100-1 that is the fixed UE 100.

In step S109, the eNB 200-1 transmits, to the eNB 200-2, pre-scheduling information which allocates the radio resource for the UE 100-1. The eNB 200-2 receives the pre-scheduling information.

In step S110, each of the eNB 200-1 and the eNB 200-2 performs scheduling. When receiving a response to step S109 from the eNB 200-2, the eNB 200-1 performs the scheduling for the cell managed by the eNB 200-1 in consideration of the response. For example, the eNB 200-1 performs the scheduling such that a beam is directed toward the UE 100-1.

On the other hand, the eNB 200-2 performs the scheduling on the basis of the fixed UE table in step S107 and the pre-scheduling information in step S109. Specifically, the eNB 200-2 performs the scheduling such that a beam is directed toward the UE 100-2 and a null is directed toward the UE 100-1.

In step S111, each of the eNB 200-1 and the eNB 200-2 transmits radio resource information in downlink (DL resource allocation) that is allocated, by the scheduling in step S110, to each UE 100 which is a subordinate of each of the eNB 200-1 and the eNB 200-2. Specifically, the eNB 200-1 transmits the radio resource information to the UE 100-1 and the eNB 200-1 transmits the radio resource information to the UE 100-2. The UE 100-1 receives the radio resource information from the eNB 200-1 and the UE 100-2 receives the radio resource information from the eNB 200-2.

In step S112, each of the eNB 200-1 and the eNB 200-2 transfers data by using the radio resource allocated to each UE 100. The UE 100-1 receives the data from the eNB 200-1 and the UE 100-2 receives the data from the eNB 200-2.

It is noted that the eNB 200-2 performs the scheduling on the basis of the fixed UE table in step S107 and the pre-scheduling information in step S109, therefore the influence of the interference from the eNB 200-2 to the UE 100-2 is small.

It is noted that the eNB 200-1 does not need to transmit the BC-PMI reporting configuration again to the fixed UE 100 to which the BC-PMI reporting configuration is transmitted once. Then, the eNB 200-1 does not need to transmit the identical BC-PMI reporting configuration again to the fixed UE 100, therefore it is possible to reduce a process load of the eNB 200-1. It is noted that when the eNB 200-1 transmits, to the fixed UE 100, BC-PMI reporting configuration of a different value from the previously transmitted BC-PMI reporting configuration (for example, the BC-PMI reporting configuration created by adding a fixed offset value to the previously transmitted BC-PMI reporting configuration), the eNB 200-1 may transmit the BC-PMI reporting configuration.

Summary of First Embodiment

In the present embodiment, the eNB 200 determines the transmission frequency of the channel state information of the UE 100, on the basis of the fixation information. Further, the eNB 200 determines, on the basis of the fixation information, lower transmission frequency than the transmission frequency of the channel state information when the UE 100 is not the fixed UE 100, as the transmission frequency of the UE 100. The fixed UE 100 is restricted in movement, therefore the changes in the channel state is small. Thus, the eNB 200 is capable of maintaining the communication quality and restraining an increase in overhead, by reducing the number of transmissions (the number of feedbacks) of the channel state information of the fixed UE 100.

Further, in the present embodiment, the eNB 200 transmits the UE capability enquiry to the UE 100 before the eNB 200 determines the transmission frequency, and receives the UE capability information including the fixation information from the UE 100. As a result, the eNB 200 is capable of acquiring the fixation information together with the UE capability information of the UE 100, and thus, it is possible to acquire the fixation information together with necessary information.

Further, in the present embodiment, when the ratio of the number of moving UEs 100 to the number of fixed UEs 100 (the number of fixed UEs 100/the number of moving UEs 100) exceeds a threshold value, the eNB 200 determines lower transmission frequency than the transmission frequency of the normal UE 100 as the transmission frequency of the fixed UE 100. As a result, it is possible to estimate that UEs 100 around the fixed UE 100 do not actively move because the ratio of the number of the UEs 100 whose movement is restricted accounts for a predetermined value in the UEs 100 within the cell managed by the eNB 200, therefore it is decided that the changes in the channel state of the fixed UE 100 is small. Therefore, the eNB 200 determine lower transmission frequency than the transmission frequency of the normal UE 100 as the transmission frequency of the fixed UE 100, and thus, it is possible to maintain the communication quality and restrain the increase in overhead.

Further, in the present embodiment, when the number of handovers in the cell of the eNB 200 is equal to or less than the threshold value, the eNB 200 determines lower transmission frequency than the transmission frequency of the normal UE 100 as the transmission frequency of the fixed UE 100. When the number of handovers in the cell of the eNB 200 is small, it indicates that the number of UEs 100 coming into the cell of the eNB 200 and the number of UEs 100 going out from the cell of the eNB 200 due to the handover are small. Therefore, it is possible to estimate that UEs 100 around the fixed UE 100 do not actively move because the number of moving UEs 100 is small, and thus it is decided that the changes in the channel state of the fixed UE 100 is small. Therefore, as described above, it is possible to maintain the communication quality and restrain the increase in overhead.

Further, in the present embodiment, the eNB 200-1 updates the fixed UE table on the basis of the channel state information. As a result, even when the number of transmissions of the channel state information from the fixed UE 100 is decreased, the scheduling can be performed on the basis of the fixed UE table, therefore it is possible to maintain the communication quality and restrain the increase in overhead.

Further, in the present embodiment, when the eNB 200-1 and the eNB 200-2 perform, in cooperation with one another, the CoMP for performing communication with the UE 100-1, each of the eNB 200-1 and the eNB 200-2 performs the scheduling for the CoMP on the basis of the fixed UE table. As a result, the fixed UE is restricted in movement, therefore the channel state is less likely to change due to the movement of the fixed UE. Thus, it is possible to improve the communication quality by the CoMP.

Further, in the present embodiment, before performing the scheduling (and the pre-scheduling), the eNB 200-1 transfers the fixed UE table to the eNB 200-2. As a result, the eNB 200-2 is capable of performing the scheduling by acquiring the fixed UE 100 and the channel state information of the fixed UE 100 by the fixed UE table, therefore it is possible to more appropriately control the CoMP.

Second Embodiment

Hereinafter, a second embodiment will be described while focusing on the differences from the first embodiment.

In the above-described first embodiment, the eNB 200 determines the transmission frequency of the fixed UE 100 on the basis of the fixation information. In the present embodiment, the UE 100 determines the transmission frequency of the channel state information in accordance with the movement state of the UE 100 itself.

The description proceeds with an assumption that the UE 100 receives, from the eNB 200, frequency information indicating the transmission frequency of the channel state information. The UE 100 receives a reporting configuration for reporting the channel state information including the frequency information.

In the present embodiment, the UE 100 sets, in accordance with the movement state, different transmission frequency against the transmission frequency indicated by the frequency information.

Specifically, when deciding that the UE 100 is stationary, the UE 100 sets lower transmission frequency than the transmission frequency indicated by the frequency information. The UE 100 may measure the location or speed to decide the movement state. Alternatively, when the difference between a first channel quality that is newly measured and a second channel quality that is measured prior to the first channel quality is equal to or less than the threshold value (that is, when the change in channel quality is equal to or less than the threshold value), the UE 100 decides that the UE 100 is stationary. As a result, the UE 100 is capable of determining the transmission frequency of the channel state information in accordance with the actual situation of the UE 100. Thus, when the change in channel is small, it is possible to reduce the number of transmissions of the channel state information. Therefore, it is possible to maintain the communication quality and restrain the increase in overhead.

Alternatively, when deciding that the UE 100 is moving at a speed in a predetermined range, the UE 100 sets higher transmission frequency than the transmission frequency indicated by the frequency information. As a result, when the changes in the channel state is large, it is possible to increase the number of transmissions of the channel state information. It is noted that the speed in the predetermined range means a range which includes the speed when the changes in the channel state is large as well as a range which includes the speed by which the channel state information transmitted by the UE 100 can be effectively utilized. For example, the speed in the predetermined range means a speed in a range of low speed to middle speed.

Alternatively, when deciding that the UE 100 is moving at a speed faster than the speed in the predetermined range, the UE 100 sets lower transmission frequency than the transmission frequency indicated by the frequency information. As a result, when the moving speed is too fast to effectively utilize the channel state information, it is possible to restrain the increase in overhead by reducing the transmission frequency. It is noted that the speed faster than the speed in the predetermined range is a speed at which the channel state information transmitted by the UE 100 cannot be effectively utilized, regardless of the changes in the channel state. For example, the speed faster than the speed in the predetermined range is high speed.

Further, when setting the transmission frequency that is determined on the basis of the movement state, against the transmission frequency indicated by the frequency information, the UE 100 may transmit, to the eNB 200 (cell), a reason for setting the transmission frequency which is determined against the transmission frequency indicated by the frequency information. As a result, the eNB 200 knows that the UE 100 changes the transmission frequency based on the determination of the UE 100, not because the UE 100 cannot appropriately receive the frequency information.

It is noted that when setting the transmission frequency against the transmission frequency indicated by the frequency information, the UE 100 may transmit the setting reason to the eNB 200, or in the case of transmitting the channel state information after setting the transmission frequency, the UE 100 may transmit the setting reason together with the channel state information. Further, in addition to the setting reason, information indicating transmission frequency set by the UE 100 may be transmitted.

Further, when deciding that the UE 100 is stationary, the UE 100 may transmit, to the eNB 200 (cell), as the above-described setting reason, the fixation information indicating that the UE 100 is the fixed UE 100 whose movement is restricted, together with the channel information.

Further, when deciding that the UE 100 is moving at the speed in the predetermined range or at the speed faster than the speed in the predetermined range, the UE 100 may transmit, as the above-described setting reason, information indicating that the UE 100 is moving at the speed in the predetermined range or at the speed faster than the speed in the predetermined range, together with at least any of the UE capability information, the channel state information, and a response to configuration information (Config.) including the frequency information.

Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

In the above-described first embodiment, the CB-CoMP is described as an example; however, the present invention is not limited to the CB-CoMP, and is applicable to other CoMP (for example, CS-CoMP, DPS-CoMP, JT-CoMP, etc.) and also applicable to MU (Multi User)-MIMO (Multiple Input Multiple Output). Further, the present invention is applicable to normal transmission. In this case, the eNB 200 stores the fixed UE table related to at least any of the CQI, the PMI, and the RI, for example, and determines, on the basis of the fixation information, the transmission frequency of the channel state information related to at least any of the CQI, the PMI, and the RI.

Further, when having a plurality of antenna elements, the eNB 200 is capable of selecting the fixed UE 100 as a partner of calibration. Here, the calibration means that the eNB 200 corrects the variation in amplitude and phase shift among the plurality of antennas. It is noted that the fixed UE 100 is preferably the UE 100 whose location is actually fixed in order for the eNB 200 to perform the calibration with high accuracy.

When selecting the fixed UE 100 for the calibration, the eNB 200 transmits, to the selected fixed UE 100, a measurement reporting configuration (measurement report config.) for the calibration. The fixed UE 100 receives the measurement reporting configuration. The fixed UE 100 performs setting for receiving a reference signal for the calibration on the basis of the measurement reporting configuration.

Next, the eNB 200 transmits, on the basis of the measurement reporting configuration, the reference signal for the calibration (or a normal reference signal). The fixed UE 100 receives the reference signal and measures the reference signal for the calibration. The fixed UE 100 reports, to the eNB 200, a measurement result of the reference signal for the calibration.

The eNB 200 performs the calibration on the basis of the measurement result. Specifically, the eNB 200 calculates a correction value used for correcting the variation in amplitude and phase shift among the plurality of antennas. The eNB 200 takes the correction value into consideration and performs an adaptive array process in an adaptive array system.

In the above-described first embodiment, the BC-PMI is mainly described as the channel state information; however the present invention is not limited thereto. The channel state information may include information indicating at least any of the CQI, the PMI, the RI, the BC-PMI, and WC-PMI. It is noted that the WC-PMI is also the special PMI, similarly to the BC-PMI. Specifically, the WC-PMI is information indicating the precoder matrix (the precoder matrix in which a beam is directed toward the UE 100-1) in which the influence of the interference exerted on the UE 100-1 is large. In other words, the WC-PMI is information indicating a precoder matrix that is not preferred for the UE 100-1.

Further, in the above-described first embodiment, the eNB 200 receives the fixation information together with the UE capability information; however the present invention is not limited thereto. The UE 100 may transmit the fixation information together with the channel state information. The eNB 200 may receive the fixation information together with the channel state information. As a result, even when not receiving an inquiry of the UE capability information including the fixation information, the eNB 200 is capable of receiving the fixation information, therefore it is possible to restrain the increase in overhead.

Further, in the above-described first embodiment, the UE 100 transmits the UE capability information including the fixation information in response to the UE capability enquiry; however the present invention is not limited thereto. The UE 100 may transmit, to the eNB 200, the UE capability information including the fixation information without the inquiry from the eNB 200. For example, the UE 100 may transmit, to the eNB 200, the UE capability information including the fixation information, when RRC connection establishment with the eNB 200 is performed.

Further, in the above-described first embodiment, the eNB 200 is capable of changing the transmission frequency of the channel state information of the fixed UE 100 in accordance with the channel state information. For example, the eNB 200 may change the transmission frequency of the channel state information, in accordance with the difference between channel state information that is newly received from the fixed UE 100 and channel state information that is previously received from the fixed UE 100. Specifically, when the difference between a value obtained by channel state information that is newly received from the fixed UE 100 (for example, a CQI value) and a value obtained by channel state information that is previously received from the fixed UE 100 is less than the threshold value, the eNB 200 may change (determine) the transmission frequency of the channel state information of the fixed UE 100 to much lower transmission frequency. Similarly, when the difference between a newly received CQI value and a previously received CQI value is equal to or more than the threshold value, for example, the eNB 200 may change (determine) the transmission frequency of the channel state information of the fixed UE 100 to higher transmission frequency.

Further, in the above-described first embodiment (step S107 in FIG. 10), the eNB 200-1 transfers the updated fixed UE table to the eNB 200-2; however the present invention is not limited thereto. For example, when a portion to be changed in the fixed UE table is within a fixed range, the eNB 200-1 may stop transferring the fixed UE table before and after updating the fixed UE table. Examples of a case when the portion to be changed in the fixed UE table is within the fixed range include: a case when the ratio of the number of fixed UEs 100 whose information is updated to the number of fixed UEs 100 recorded in the fixed UE table (the number of fixed UEs 100 whose information is updated/ the entire number of fixed UEs 100) is less than the threshold value; and a case when the number of fixed UEs 100 whose information is updated is less than the threshold value. It is noted that the eNB 200-1 may decide whether or not to stop transferring the table, not before and after updating the fixed UE table, but on the basis of the difference between the fixed UE table transmitted to the eNB 200-2 and the latest fixed UE table of the eNB 200-1.

Further, in the above-described first embodiment (steps S108 to S109 in FIG. 10), the eNB 200-1 performs the pre-scheduling and then transmits the pre-scheduling information to the eNB 200-2; however the present invention is not limited thereto. The eNB 200-2 may perform the pre-scheduling on the basis of the fixed UE table received from the eNB 200-1 (and the fixed UE table of the eNB 200-2), and then transmit the pre-scheduling information to the eNB 200-1. The eNB 200-1 performs the scheduling on the basis of the pre-scheduling information from the eNB 200-2. Alternatively, after receiving the pre-scheduling information from the eNB 200-1, the eNB 200-2 may perform the scheduling (or the pre-scheduling) and then transmit, to the eNB 200-1, the scheduling information (or the pre-scheduling information) that is a result of the scheduling (or the pre-scheduling). In this case, the eNB 200-1 performs the scheduling on the basis of the scheduling information (or the pre-scheduling information) from the eNB 200-2 in which the pre-scheduling information from the eNB 200-1 is taken into consideration.

Further, the above-described first embodiment, second embodiment, and other embodiments can be appropriately combined and executed. For example, the UE 100 according to the second embodiment may set, in accordance with the movement state of the UE 100, different transmission frequency against the transmission frequency indicated by the frequency information from the eNB 200 according to the first embodiment. Further, the eNB 200 according to the first embodiment may newly determine the transmission frequency of the UE 100 or manage information of the transmission frequency of the UE 100, on the basis not only of the fixation information but also of the setting reason from the UE 100 according to the second embodiment (and/or the transmission frequency set by the UE 100).

Further, in the above-described first embodiment, the eNB 200 determines the transmission frequency; however the present invention is not limited thereto. It may not be the eNB 200 but may be an apparatus configuring the core network (for example, the MME, and the OAM) or a management server.

Further, in the above-described embodiment, an example of applying the present invention to the LTE system is described; however, the present invention is not limited thereto, and the present invention may be applied to a system other than the LTE system.

It is noted that the entire content of Japanese Patent Application No. 2013-199884 (filed on Sep. 26, 2013) is incorporated in the present specification by reference.

INDUSTRIAL APPLICABILITY

As described above, the network apparatus and the user terminal according to the present invention are possible to reduce overhead due to transmission of channel state information from a user terminal, thus they are useful in the mobile communication field.

The invention claimed is:

1. A network apparatus in a mobile communication system, comprising: a receiver configured to receive, from a user terminal, channel state information corresponding to a channel state of a downlink signal from a cell to which the user terminal is connected, to the user terminal; a controller configured to determine transmission frequency of the channel state information; and a transmitter configured to transmit, to the user terminal, frequency information indicating the transmission frequency determined by the controller, wherein the controller is further configured to determine determines the transmission frequency of the user terminal on the basis of fixation information indicating that the user terminal is a fixed user terminal whose movement is restricted the controller is further configured to determine, on the basis of the fixation information, as the transmission frequency of the user terminal, lower transmission frequency than normal transmission frequency of the channel state information when a ratio of a number of fixed user terminals within the cell to the number of user terminals other than the fixed user terminals within the cell exceeds a threshold value.

2. The network apparatus according to claim 1, wherein the transmitter transmits is further configured to transmit, to the user terminal, an inquiry of capability information indicating capability of the user terminal before the controller determines the transmission frequency, and the receiver receives is further configured to receive, from the user terminal, the capability information that includes the fixation information and is transmitted in response to the inquiry.

3. The network apparatus according to claim 1, wherein the receiver receives is further configured to receive the fixation information together with the channel state information.

4. The network apparatus according to claim 1, wherein the controller determines is further configured to determine the lower transmission frequency than the normal transmission frequency as the transmission frequency of the user terminal when a number of handovers in the cell is equal to or less than a threshold value.

5. The network apparatus according to claim 1, wherein the channel state information includes information indicating at least any of channel quality information indicating reception quality of a channel state of a downlink signal, precoder matrix information indicating a precoder matrix which determines transmission directionality, rank information indicating a rank which determines a number of signal sequences, and a special precoder matrix that is used to determine a precoder matrix applicable to downlink multi-antenna transmission to another user terminal different from the user terminal as well as that is a precoder matrix in which a null or a beam is directed toward the user terminal.

6. The network apparatus according to claim 1, further comprising: a storage configured to store a table in which an identifier indicating a user terminal that is the fixed user terminal and the channel state information from the fixed user terminal are associated, wherein the storage updates is configured to update the table on the basis of the received channel state information.

7. The network apparatus according to claim 6, wherein the network apparatus is a base station configured to manage the cell, and the controller performs is further configured to perform scheduling for CoMP communication on the basis of the table when the CoMP communication in which the base station and a neighboring base station adjacent to the base station perform, in cooperation with each other, communication with the user terminal is performed.

8. The network apparatus according to claim 7, wherein the controller performs is further configured to control to transfer the table to the neighboring base station before performing the scheduling.

9. The network apparatus according to claim 1, wherein the network apparatus is a base station configured to manage the cell and have a plurality of antenna elements, the controller selects is further configured to select the user terminal that is the fixed user terminal as a partner for calibration for correcting a variation in amplitude and phase shift among the plurality of antennas, the receiver receives is further configured to receive, as the channel state information, a measurement report used for the calibration from the user terminal which is the partner, and the controller performs is further configured to perform the calibration on the basis of the measurement report.

10. A user terminal in a mobile communication system, comprising: a transmitter configured to transmit, to a cell to which the user terminal is connected, channel state information corresponding to a channel state of a downlink signal from the cell to the user terminal; a receiver configured to receive frequency information indicating transmission frequency of the channel state information; and a controller configured to set the transmission frequency on the basis of the frequency information, wherein the controller is further configured to set, in accordance with a movement state of the user terminal, different transmission frequency against the transmission frequency indicated by the frequency information, and the controller is further configured to set lower transmission frequency than the transmission frequency indicated by the frequency information as the different transmission frequency when deciding that the user terminal is stationary.

11. The user terminal according to claim 10, wherein the controller performs is further configured to perform control to periodically or unperiodically measure channel quality of a downlink, and the controller decides is further configured to decide that the user terminal is stationary when a difference between first channel quality that is newly measured and second channel quality that is measured prior to the first channel quality is equal to or less than a threshold value.

12. The user terminal according to claim 10, wherein the transmitter transmits is further configured to transmit, to the cell, together with the channel state information, fixation information indicating that the user terminal is a fixed user terminal whose movement is restricted, as a reason for setting the different transmission frequency when it is decided that the user terminal is stationary.

13. The user terminal according to claim 10, wherein the controller is further configured to set higher transmission frequency than the transmission frequency indicated by the frequency information, as the different transmission frequency when deciding that the user terminal is moving at a speed in a predetermined range.

14. The user terminal according to claim 13, wherein the controller is further configured to set lower transmission frequency than the transmission frequency indicated by the frequency information, as the different transmission frequency when deciding that the user terminal is moving at a speed faster than the speed in the predetermined range.

15. The user terminal according to claim 14, wherein the transmitter transmits is further configured to transmit information indicating that the user terminal is moving at the speed in the predetermined range or at the speed faster than the speed in the predetermined range, as a reason for setting the different transmission frequency, together with at least any of capability information indicating capability of the user terminal, the channel state information, and a response to setting information including the frequency information when it is decided that the user terminal is moving at the speed in the predetermined range or at the speed faster than the speed in the predetermined range.

* * * * *